United States Patent [19]
Kawaguchi et al.

[11] Patent Number: 4,800,818
[45] Date of Patent: Jan. 31, 1989

[54] LINEAR MOTOR-DRIVEN CONVEYOR MEANS

[75] Inventors: Kojiro Kawaguchi, Osaka; Shohei Furukawa, Kobe, both of Japan

[73] Assignee: Hitachi Kiden Kogyo Kabushiki Kaisha, Amagasaki, Japan

[21] Appl. No.: 926,185

[22] Filed: Nov. 3, 1986

[30] Foreign Application Priority Data
Nov. 2, 1985 [JP] Japan .................. 60-246906

[51] Int. Cl.$^4$ .................................. B60L 13/00
[52] U.S. Cl. ...................... 104/290; 104/292
[58] Field of Search ............ 104/290, 292, 295, 296, 104/287; 318/687, 135; 310/12, 13; 198/811

[56] References Cited
U.S. PATENT DOCUMENTS

| | | | |
|---|---|---|---|
| 3,894,275 | 7/1975 | Baumano et al. | 318/687 X |
| 3,904,942 | 9/1975 | Holtz | 318/687 X |
| 4,267,471 | 5/1981 | Popov et al. | 310/13 |
| 4,489,825 | 12/1984 | Gladish | 104/23.2 X |
| 4,550,823 | 11/1985 | Gladish | 198/811 X |
| 4,574,706 | 3/1986 | Dehne | 104/292 X |
| 4,613,805 | 9/1986 | Matsuo et al. | 104/292 X |
| 4,613,962 | 9/1986 | Inoue et al. | 318/135 X |
| 4,616,960 | 10/1986 | Gladish | 104/134 X |

Primary Examiner—Kenneth J. Dorner
Assistant Examiner—Laurie K. Cranmer
Attorney, Agent, or Firm—Wenderoth, Lind & Ponack

[57] ABSTRACT

A linear motor-driven conveyor means includes a linear motor and a linear step motor and provides high speed conveying and sotp position determining of high accuracy with a simple controlling device.

6 Claims, 19 Drawing Sheets

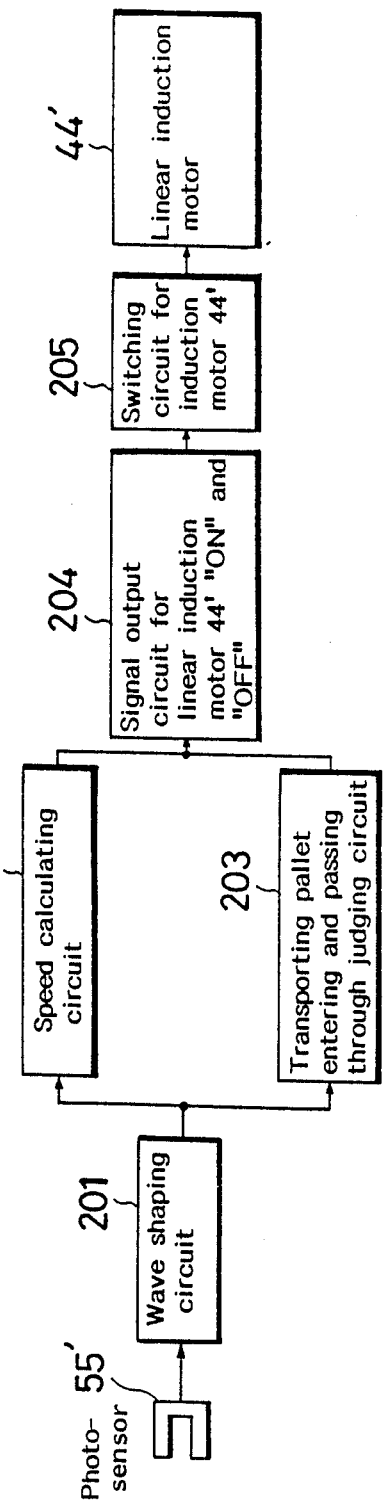
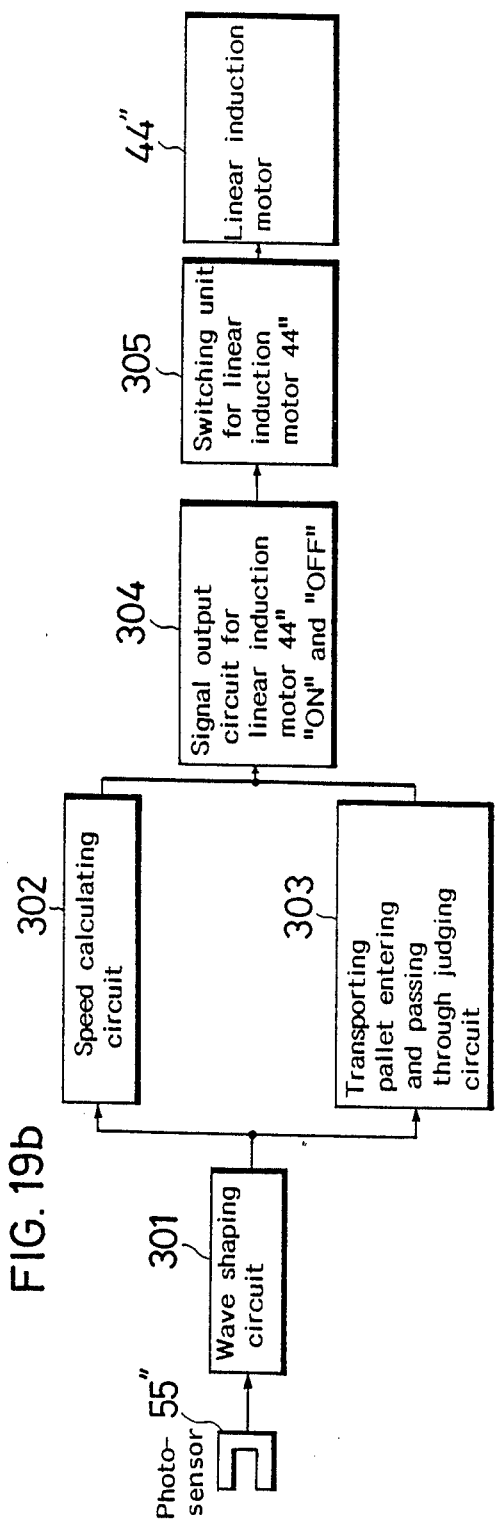
FIG. 19a
FIG. 19b ved in accelerating the conveyor means. This is because of the fact that if the frequency of the exciting pulse becomes high, it becomes impossible to supply sufficient electric current to coils (affected by the inductance of coils).

LINEAR MOTOR-DRIVEN CONVEYOR MEANS

BACKGROUND OF THE INVENTION

1. Field of the Invention

This invention relates to a linear motor-driven conveyor means having a transporting pallet which runs on a transporting track as it is driven by a linear motor.

2. Description of the Prior Art

As conventional conveyor means using a linear motor, there are available a conveyor means using only a linear step motor and a conveyor means using only a linear induction motor.

FIG. 1 shows an example of the conveyor means using a linear step motor. This conveyor means comprises a transporting pallet 71, wheels 72, a guide roller 73, a secondary side 74 of a linear step motor and a slit plate 75 which intercepts a photo-sensor 83. Rails 81, a primary side 82 of the linear step motor and photo-sensor 83 are fixedly positioned. The photo-sensor 83 is arranged in four pieces so designed that the sensor pattern varies with each single step movement of the linear step motor. This sensor pattern forms one pitch per eight steps in the case of the 1-2 phase excitation method of a 4-phase VR type (variable reluctance type) and therefore eight different sensor patterns are available. More particularly, four elements (decision of excitation phase, speed of the transporting pallet, moving direction of the transporting pallet and the detection of the position of the transporting pallet) are detected by four sensors for control purposes.

FIG. 2 is an example of the time-speed characteristic at the acceleration of a conveyor means using a linear step motor. The conveyor means using a linear step motor can easily carry out controlled speed reduction and positioning, but the maximum speed at acceleration (when leaving a station) is only about 1 meter/second, even if the supply of exciting current is increased, as shown by FIG. 2, and difficulty has been found in accelerating the conveyor means. This is because of the fact that if the frequency of the exciting pulse becomes high, it becomes impossible to supply sufficient electric current to coils (affected by the inductance of coils).

FIG. 3 shows a conveyor means using a linear induction motor. This conveyor means comprises a transporting pallet 71, wheels 72, a guide roller 73, a secondary side 76 of the linear induction motor and a slit plate 75 for intercepting a photo-sensor 83. On the fixed side of this conveyor means, there are rails 81, a primary side 84 of the linear induction motor and a photo-sensor 83.

FIG. 4 shows the composition of a controlling device of a conventional conveyor means using a linear step motor. Numeral 31 designates an outside apparatus which can be a computer, a control device such as a robot arranged on a transporting line side, push-buttons to be operated manually or the like, and gives pallet destination instructions. Numeral 32 designates a linear step motor controller which, when destination instructions are input from the outside apparatus 31, decides the accelerating direction of a pallet and controls acceleration, deceleration and positioning of a pallet by synchronizing with inputs from sensors. Numeral 33 designates a linear step motor driver which provides current amplification of exciting patterns of the linear step motor controller 32 and supplies exciting current to each phase of a linear step motor 34 of the 4-phase VR type (variable reluctance type). Numeral 35 designates a sensor arranged on the ground side (station side) which detects the speed, position information and moving direction of a pallet.

FIG. 5 shows the composition of a controlling device of the conventional conveyor means using a linear induction motor. Numeral 31 designates an outside device, the same as that in FIG. 4. Numeral 42 designates a linear induction motor controller which controls acceleration, deceleration and positioning of a linear induction motor 44. Numeral 43 designates a speed controlling device which varies the speed of the linear induction motor 44. An inverter controlling device and a voltage controlling device are generally used for this speed controlling device. Numeral 45 designates a sensor which performs the same as the sensor 35 in FIG. 4. Numeral 46 designates a switching unit for "ON" and "OFF" switching of a positioning device 47, normally a fine positioner.

FIG. 6 shows an example of the time-speed characteristic upon acceleration of a conveyor means using a linear induction motor. As shown in FIG. 6, the maximum speed at acceleration can be raised by making the capacity of a motor larger, but control of positioning is difficult. Although the use of electromagnets, the use of two linear induction motors for opposite excitation, and the use of a mechanically operated fine positioner and other devices have been attempted, it is difficult to effect positioning quickly and at a high precision.

SUMMARY OF THE INVENTION

A first embodiment of the present invention provides a linear motor-driven conveyor means using a transporting pallet which runs along a transporting track. This conveyor means is characterized in that a primary side of a linear step motor and a primary side of a linear induction motor are arranged side by side at a transporting track station at a right angle to the advancing direction of the transporting pallet, a secondary side of the linear step motor and a secondary side of the linear induction motor are arranged side by side at the transporting pallet opposite to the primary side of the linear step motor and the linear induction motor, and thus the linear step motor and the induction motor are combined.

A second embodiment of the present invention provides a linear motor-driven conveyor means using a transporting pallet which runs along a transporting track. This conveyor means is characterized in that a secondary side plate of a linear step motor and a secondary side plate of a linear induction motor are arranged side by side at a transporting station at a right angle to the advancing direction of the transporting pallet, a primary side of the linear step motor and the primary side of a linear induction motor are arranged side by side at the transporting pallet opposite to the secondary sides of the linear step motor and the linear induction motor, and thus the linear step motor and the linear induction motor are combined.

A third embodiment of the present invention provides a conveyor means which is driven by a linear step motor wherein a primary side of the linear step motor is mounted at a track station or on a transporting pallet and a secondary side of the linear step motor is arranged opposite to the primary side. A linear induction motor includes a primary side mounted at the track station or on the transporting pallet and a secondary side arranged opposite to the primary side. A further linear induction motor for speed acceleration and deceleration includes a primary side or a secondary side arranged in the advancing direction of the transporting pallet, whereby the linear induction motor for speed acceleration and deceleration is connected to the afore-mentioned linear induction motor upon advancement of the transporting pallet.

A fourth embodiment of the present invention provides a conveyor means to be driven by linear step motor wherein a primary side of the linear step motor is mounted at a track station or on a transporting pallet and a secondary side of the linear step motor is arranged opposite to the primary side. A linear induction motor includes a primary side mounted at the track station or on the transporting pallet and a secondary side arranged opposite to the primary side. A further linear induction motor for speed acceleration and deceleration includes a primary side mounted at the track station or on the transporting pallet and a secondary side arranged opposite to the primary side, a linear induction motor for speed acceleration and is combined with the afore-mentioned linear induction motor upon advancement of the transporting pallet. A plurality or set of sensors corresponding to the above-mentioned linear induction motor for speed acceleration and deceleration, detects the speed and judges the position of the transporting pallet.

BRIEF DESCRIPTION OF THE DRAWINGS

The nature and advantage of the present invention will be more apparent from the following description made with reference to the accompanying drawings, in which:

FIGS. 19a and 19b are circuit diagrams for illustrating turning the linear induction motor "ON" and "OFF", wherein FIG. 19a is a circuit diagram for a first linear induction motor and FIG. 19b is a circuit diagram for a second linear induction motor;

DETAILED DESCRIPTION OF THE INVENTION

Preferred embodiments of the present invention are described below with reference to the accompanying drawings.

Figure 7:
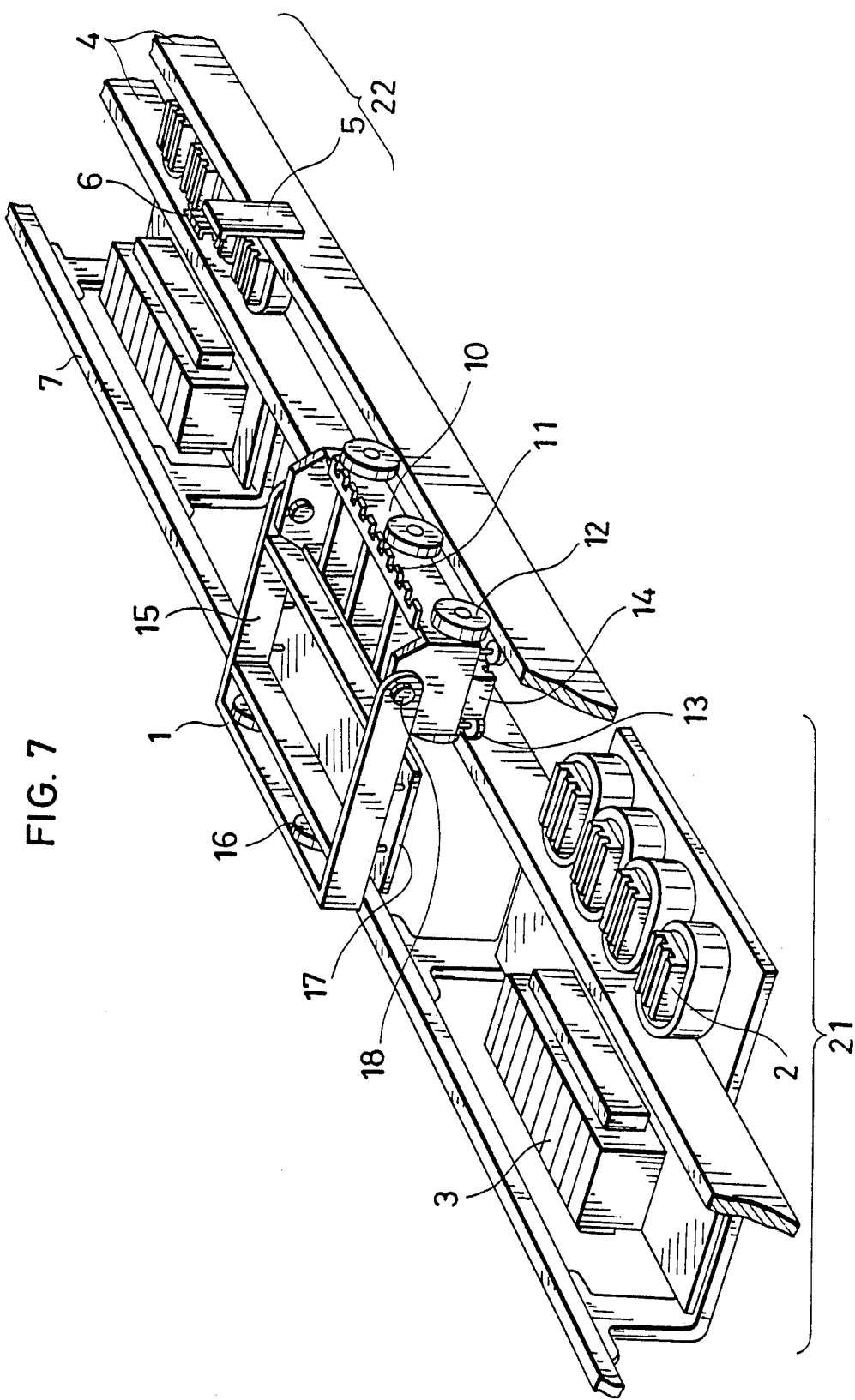
FIG. 7 is a perspective view of a first embodiment of a linear step motor and linear induction motor-driven conveyor according to the invention.

FIG. 7 is a perspective view of a first embodiment of the present invention.

First of all, description will be made of the construction of a transporting pallet.

Numeral 1 designates a transporting pallet which comprises a pallet 10 for a linear step motor and a bed portion 15. The pallet 10 for the linear step motor has a slit plate 11 for intercepting a sensor 6, wheels 12 which run on rails 4, a guide roller 13 for guiding the pallet 10 and a linear step motor secondary conductive or side plate 14.

Since the pallet 10 for a linear step motor is subjected to a fairly large attraction force by a linear step motor primary side or core 2, in this embodiment the pallet 10 itself is of firm construction so as to prevent if from bending, and six wheels 12 are used.

The bed portion 15 is composed of sub-wheels 16 running on a sub-rail 7 and a linear induction motor secondary conductive or side plate 17. Bed portion 15 may be of comparatively light weight construction.

The bed portion 15 is connected to the pallet 10 by a free connecting device 18. By this connecting device 18, stable running of the pallet 10 can be maintained even when there exists a difference in level between the rails 4 and sub-rail 7.

A track station 21 comprises the linear step motor primary side 2 and a linear induction motor primary side or core 3 provided parallel with each other. Another track station 22 has a photo-sensor 6 which is fixed by a sensor stand 5. This photo-sensor 6 detects position information and speed information of the transporting pallet 1.

Two rails 4 are used in this embodiment so as to maintain stably a small gap between the linear step motor primary side 2 and the linear step motor secondary side plate 14.

Figure 8:
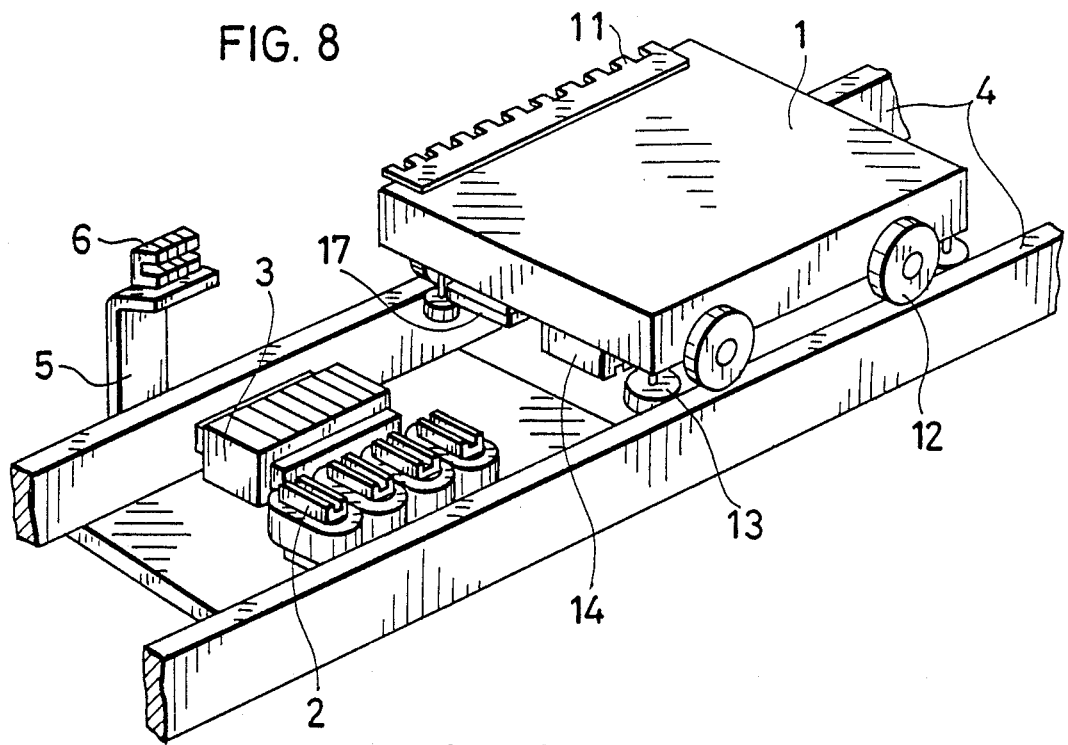
FIG. 8 is a perspective view of the conveyor means showing a second embodiment of the present invention.

A second embodiment of the present invention is shown in FIG. 8.

In this embodiment, the linear step motor primary side 2 and the linear induction motor primary side 3 are fixedly positioned, are the linear step motor secondary side plate 14 and the linear induction motor secondary side plate 17 are mounted on the transporting pallet 1. Contrary to the above arrangement, it is possible to fixedly position secondary side plate of each linear motor and to mount the primary side of each motor to the transporting pallet 1.

In this embodiment, the bed portion 15 and the pallet 10 for a linear step motor are integrated with each other so as to make the construction of the transporting pallet 1 simple.

In either of the first and second embodiments, since the linear step motor primary side and the linear induction motor primary side are arranged side by side in a direction at a right angle to the advancing direction of the transporting pallet, it is possible to shorten the space between stations.

Figure 4:
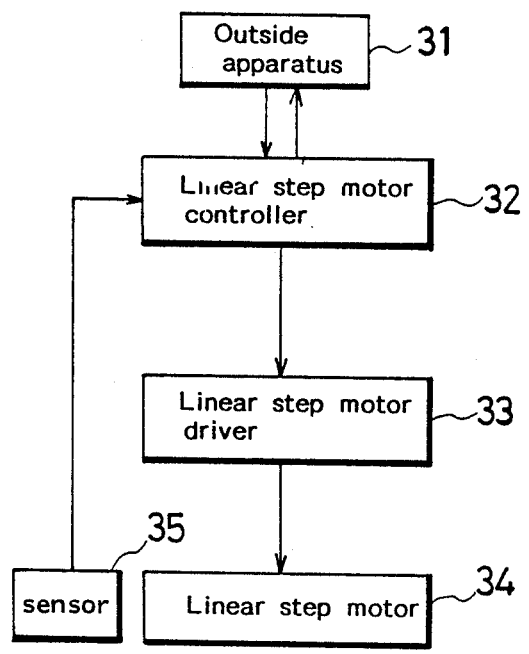
FIG. 4 is a block diagram showing the composition of a controlling device of a conveyor means using the conventional linear step motor.
Figure 5:
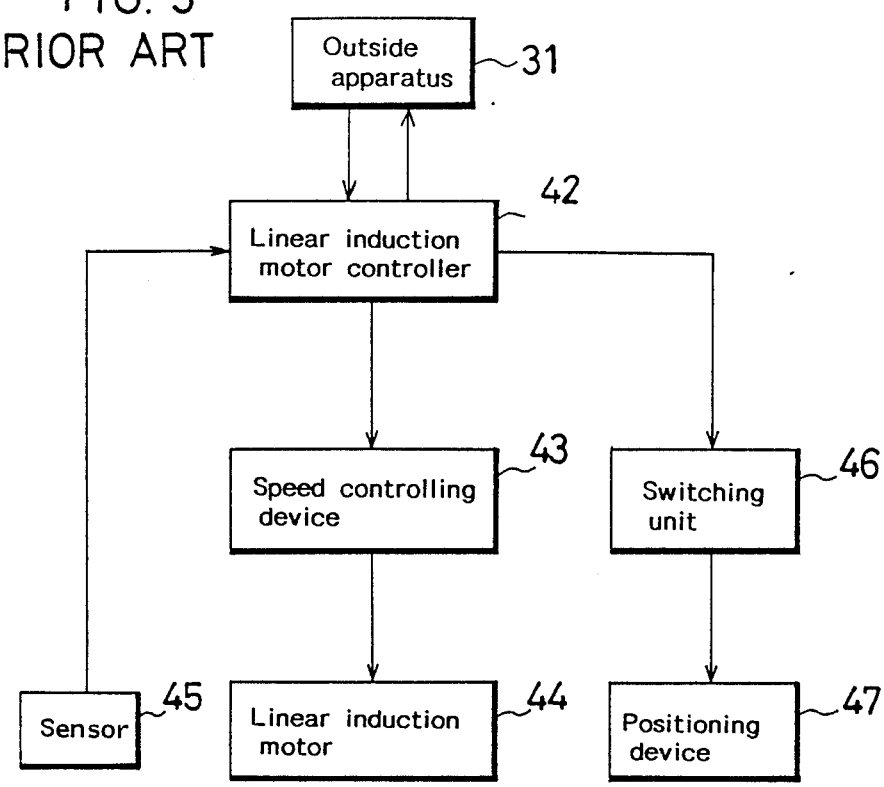
FIG. 5 is a block diagram showing the composition of a controlling device of a conveyor means using the conventional linear induction motor.
Figure 6:
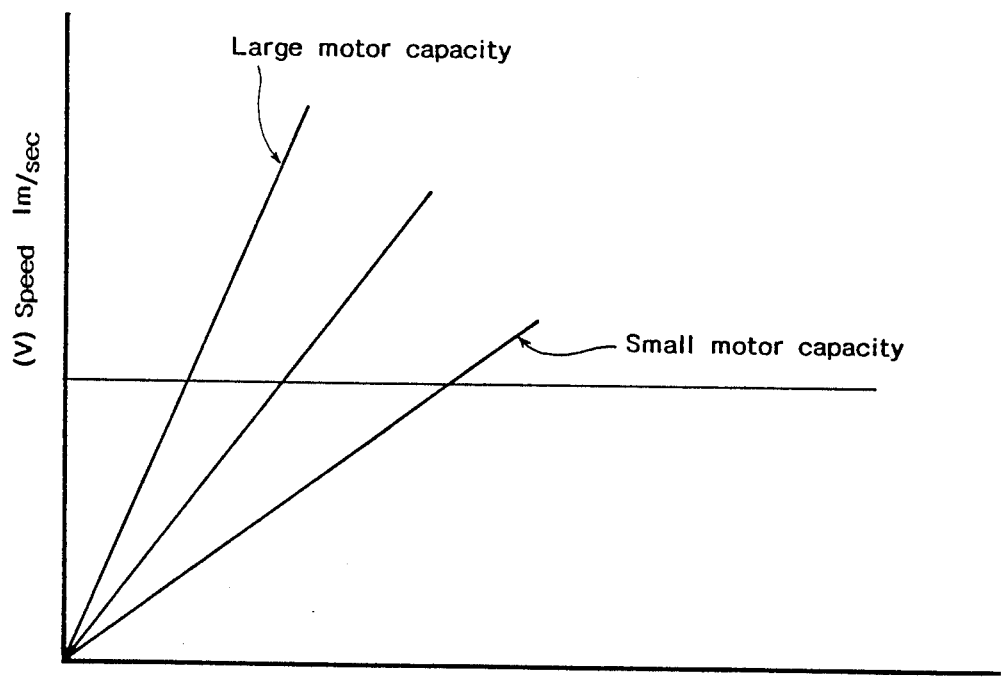
FIG. 6 is a graph showing the time-speed characteristic at the time of acceleration in the conveyor means shown in FIG. 3.
Figure 9:
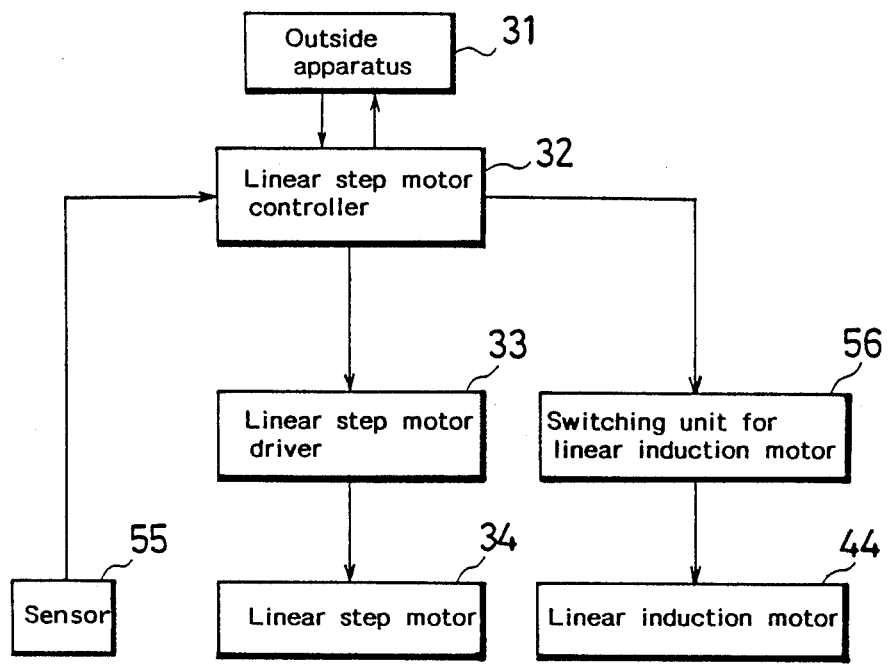
FIG. 9 is a block diagram of a controlling device for the conveyor means of the first and second embodiments of the present invention.

The composition of the controlling device of the first and second embodiments of the present invention is a combination of the compositions shown in FIG. 4 and FIG. 5 but can be simplified as shown in FIG. 9.

In FIG. 9 numeral 31 designates an outside apparatus, such as a computer, a robot controlling device arranged at the transporting line, push-buttons which are operated manually or the like, that gives destination instructions to the pallet.

Numeral 32 designates a linear step motor controller, that, when destination instructions are input from the outside apparatus, determines an accelerating direction of the pallet and carries out control of acceleration, deceleration and positioning of the pallet by synchronizing the input from the outside apparatus with the input from the sensors.

Numeral 33 designates a linear step motor driver that effects current amplification of the exciting pattern of the linear step motor controller 32 and applies exciting current to each phase of a linear step motor 34. In this embodiment, this linear step motor is of the 4-phase VR type (variable reluctance type).

The linear step motor controller 32 not only controls the linear step motor 34 but controls "ON" and "OFF" switching of a linear induction motor 44. Therefore, the linear induction motor controller 42 in FIG. 5 can be dispensed with.

Since a switching unit 56 for the linear induction motor can be merely a switch for "ON" and "OFF" control of current supply to the linear induction motor 44, the complicated speed controlling device 43 as shown in FIG. 5 is not required. A sensor 55 can be the sensor 35 shown in FIG. 4, and the sensor 45 shown in FIG. 5 can be dispensed with.

The switching unit 46 and the positioning device 47 shown in FIG. 5 can be dispensed with because the linear step motor 34 can achieve positioning.

From the foregoing, the composition of the controlling device of the first and second embodiments of the present invention can be made simpler than the controlling device which is a combination of the conventional linear step motor and the conventional linear induction motor.

Description is made below of the operation of the first and the second embodiments of the present invention.

Figure 10:
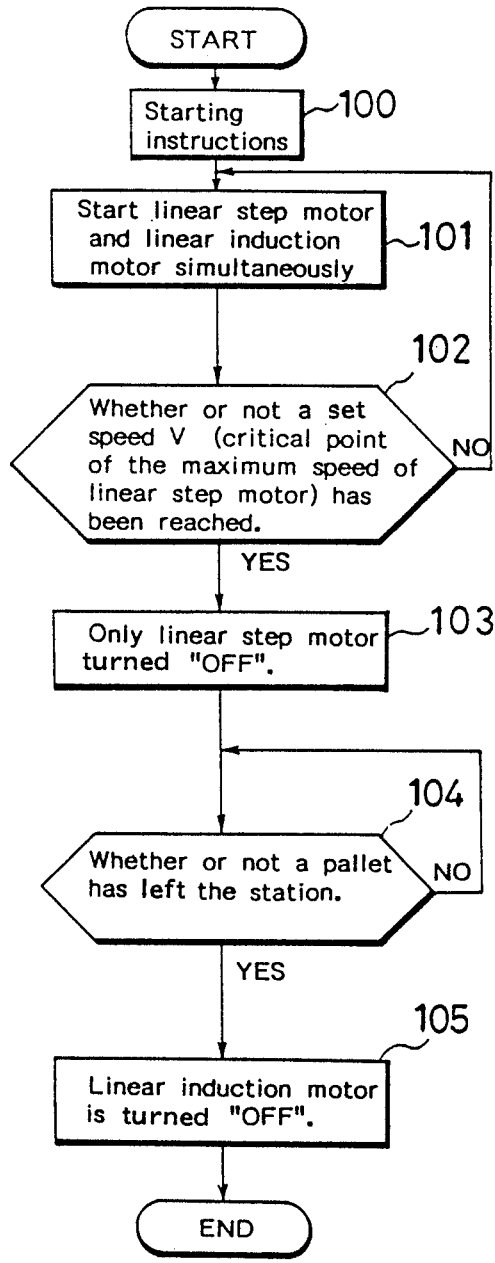
FIG. 10 is a flow chart at the time of acceleration of a transporting pallet of the first and second embodiments.

FIG. 10 shows a flow chart at the time of acceleration of the transporting pallet of the present invention.

Figure 1:
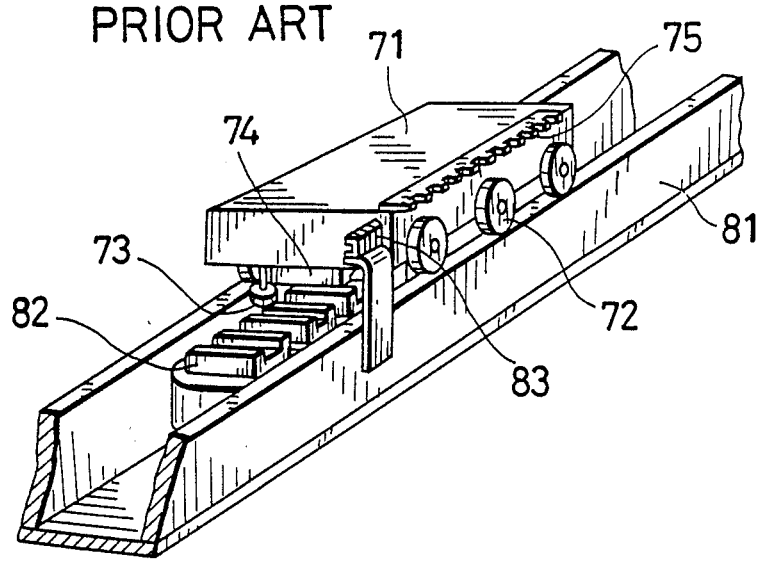
FIG. 1 is a perspective view of a conveyor means using a conventional linear step motor.
Figure 2:
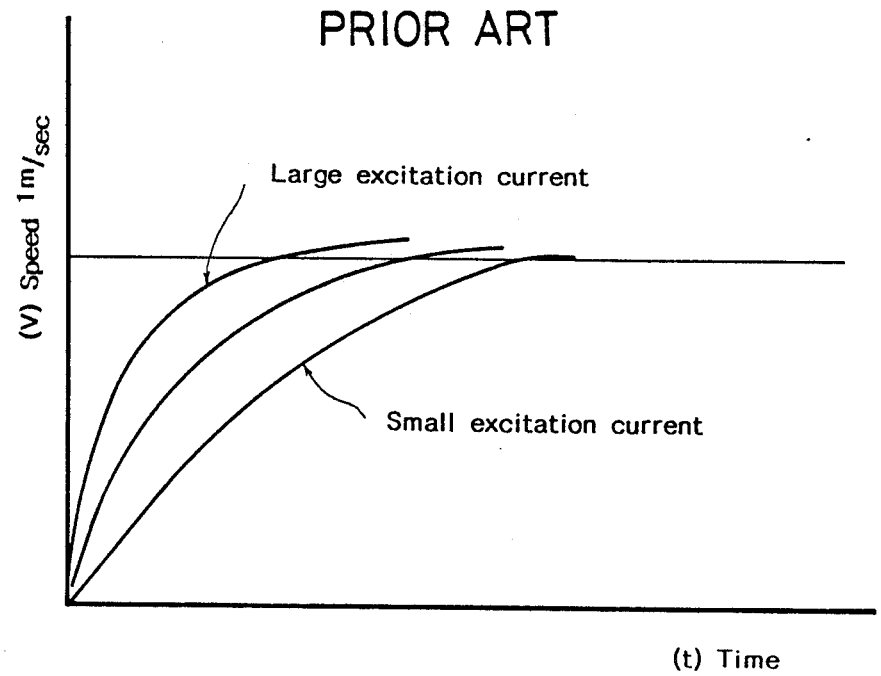
FIG. 2 is a graph showing the time-speed characteristic at the time of acceleration in the conveyor means shown in FIG. 1.
Figure 3:
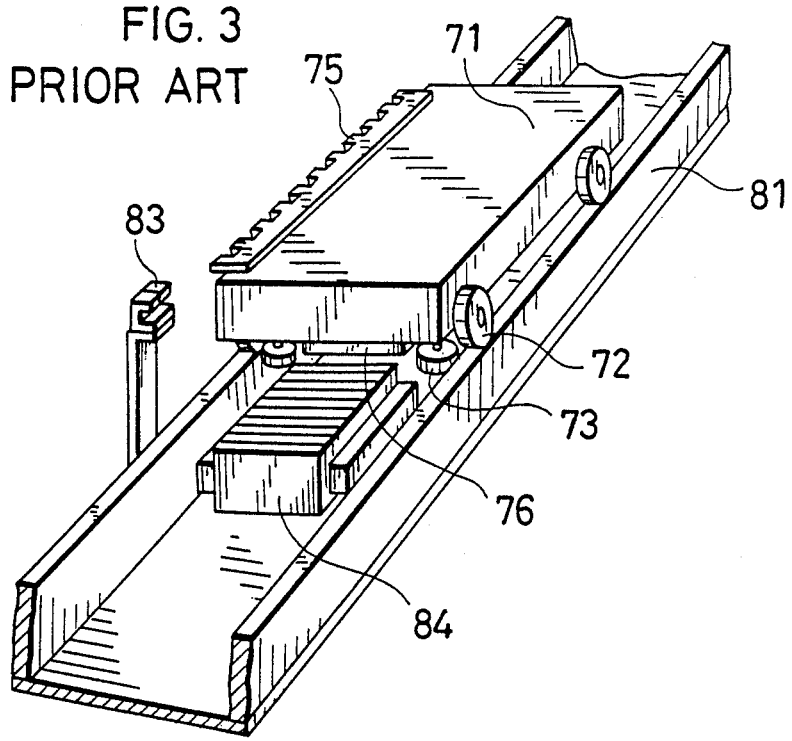
FIG. 3 is a perspective view of a conveyor means using a conventional linear induction motor.

As soon as starting instructions are input (step 100) from the outside apparatus 31 (computer, outside controlling device, operational buttons or the like) to the controller 32, the controller 32 judges an accelerating direction and makes the linear step motor 44 and the linear induction motor 34 start simultaneously (101) so as to have the pallet accelerated in the same direction. The transporting pallet 1 is accelerated abruptly by thrust from the two motors and when it reaches a specified set speed V1 (102), the linear step motor 34 is turned "OFF" and thereafter acceleration is effected by the linear induction motor 44 (103). This is because, as is obvious from the speed characteristic of the linear step motor 34 shown in FIG. 2, there is a critical point for the maximum speed of the linear step motor 34 and when the speed exceeds the critical point, accelerating thrust is not generated by the linear step motor 34 and excitation thereof is meaningless.

Then, upon detecting (104) by the sensor 55 or another sensor that the transporting pallet 1 has left the station, the linear induction motor 44 is turned "OFF" (105) and thus control of acceleration terminates.

Figure 11:
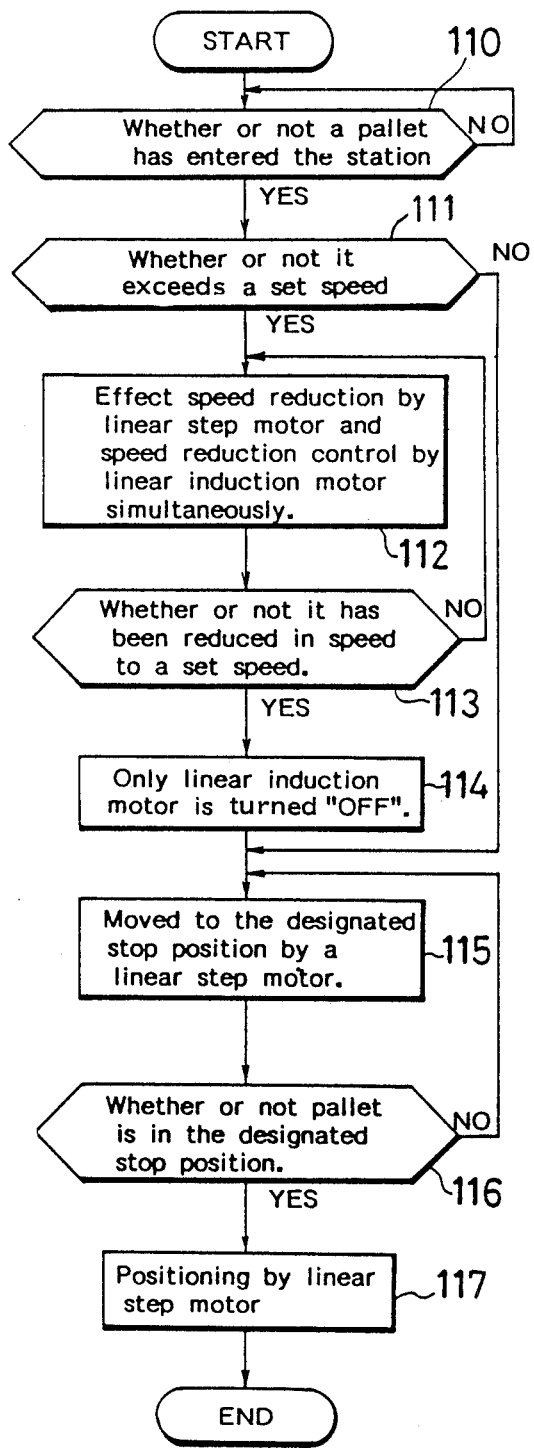
FIG. 11 is a flow chart of the transporting pallet of the first and second embodiments, at the time of speed deceleration and positioning.

FIG. 11 shows a flow chart at the time of deceleration and positioning of the transporting pallet 1 of the first and second embodiments of the present invention.

Upon entering of the transporting pallet 1 from another station to a designated station (110), the sensor 55 detects an entering direction and an entering speed and if the entering speed is in excess of a specified set speed V2 (111), the speed is reduced (112) by both the linear induction motor 44 and the linear step motor 34. Regarding the method of speed deceleration, in the case of the linear induction motor 44 a negative phase control is effected so that thrust is generated opposite to the entering direction of the transporting pallet 1. In the case of the linear step motor 34, the sensor 55 effects a closed loop control and therefore by exciting the phase where teeth of the primary side of the linear step motor 34 and teeth of the secondary side plate engage with each other, the speed of the transporting pallet 1 can be reduced.

Upon reduction of the speed to the specified set speed V3, deceleration by the linear induction motor 44 and the negative phase control is stopped (114). Thereafter, the transporting pallet 1 is moved toward the designated stop position by the linear step motor 34 (115). When the transporting pallet 1 reaches the designated stop position (116), the transporting pallet 1 is held by the linear step motor 34 and positioning is carried out (117).

The set value of each of the set speeds V1, V2 and V3 is variable, and in this embodiment V2>V3.

Description now will be made of third and fourth embodiments of the present invention.

Figure 12:
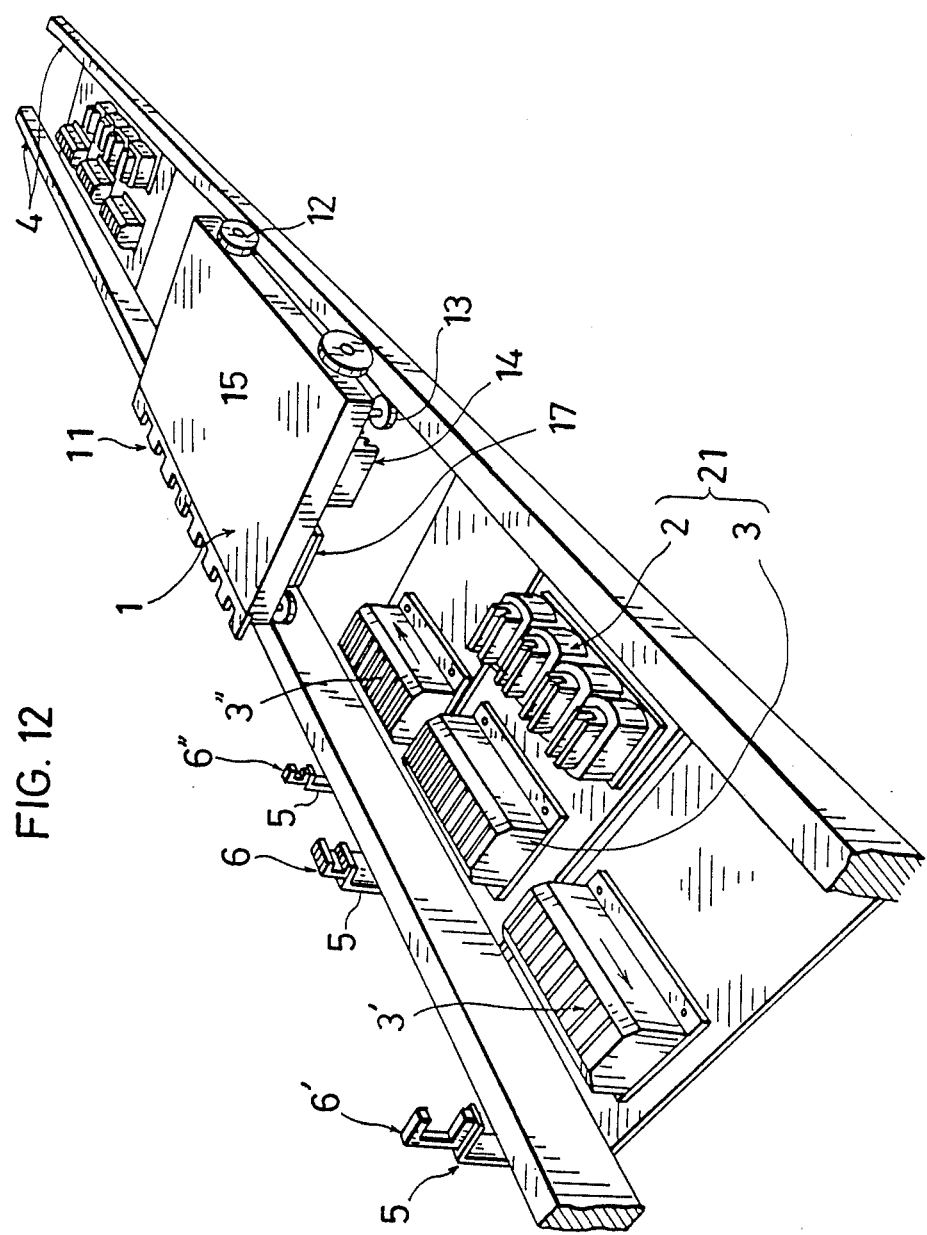
FIG. 12 is a perspective view of the linear step motor and linear induction motor-driven conveyor means showing of a third embodiment of the present invention.

Referring to FIG. 12, all of transporting pallet 1, rails 4, wheels 12, a guide roller 13, a linear step motor secondary side plate 14, a linear induction motor secondary side plate 17, a slit plate 11 for intercepting sensors, a bed portion 15, etc. are identical with those of the second embodiment.

The linear step motor primary side 2 and the linear induction motor primary side 3 are arranged side by side at the station 21. Linear induction motor primary sides 3' and 3'' for acceleration purposes are arranged on opposite side, in the advancing direction, of the primary side 3. A plurality of photo-sensors 6, 6', 6'' are fixed by sensor stands 5 for detecting position information and speed information of the transporting pallet 1.

In this embodiment, two rails 4 are used for the purpose of holding stably a small gap between the primary side and the secondary side plate of each linear motor.

In the embodiment of FIG. 12, the linear step motor primary side 2 and the linear induction motor primary sides 3, 3', 3'' are fixedly positioned, and the linear step motor secondary side plate 14 and the linear induction motor secondary side plate 17 are mounted on the transporting pallet 1. On the contrary, it is possible to fixedly position the secondary side plate of each linear motor and to mount the primary side of each motor at the transporting pallet 1.

In FIG. 12, in the case where the speed of the transporting pallet is too high for the photo-sensor 6' or the photo-sensor 6'' to respond at the pitch of the slits of slit plate 11, it is recommended to provide another slit plate 111 (FIG. 15) having a large pitch for ensuring response by the photo-sensor 6' or the photo-sensor 6''.

In this embodiment, transmission photo-sensors are used but reflex photo-sensors, proximity switches or magnetic sensors can be used.

Figure 13:
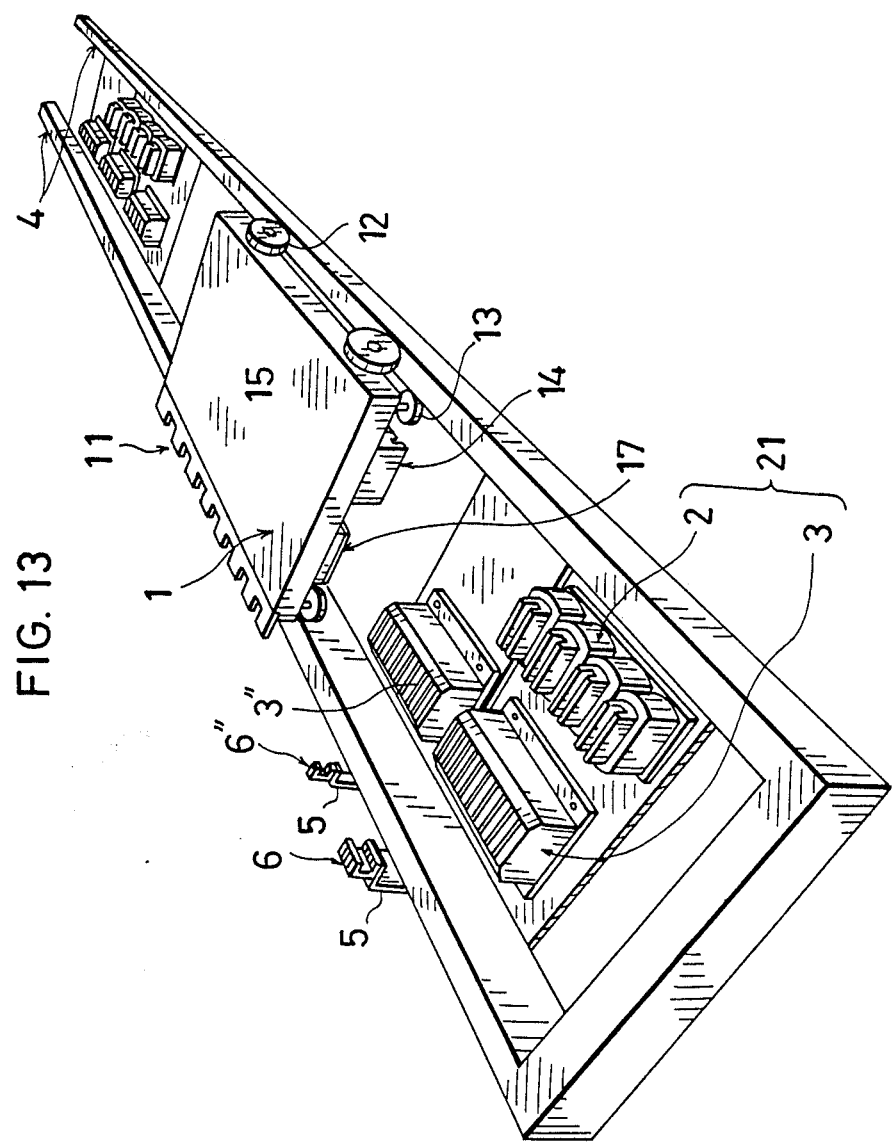
FIG. 13 is a perspective view of an end portion of the conveyor means shown in FIG. 12.

FIG. 13 shows an embodiment of an end portion of the transporting track of this embodiment of the present invention. The linear step motor primary side 2 and the linear induction motor primary side 3 are arranged side by side at the station 21. A linear induction motor primary side 3'' is provided at one side of the linear induction motor primary side 3 for speed acceleration and deceleration. The action of this embodiment is the same as that to be described later with reference to the embodiment of FIG. 12.

Figure 14:
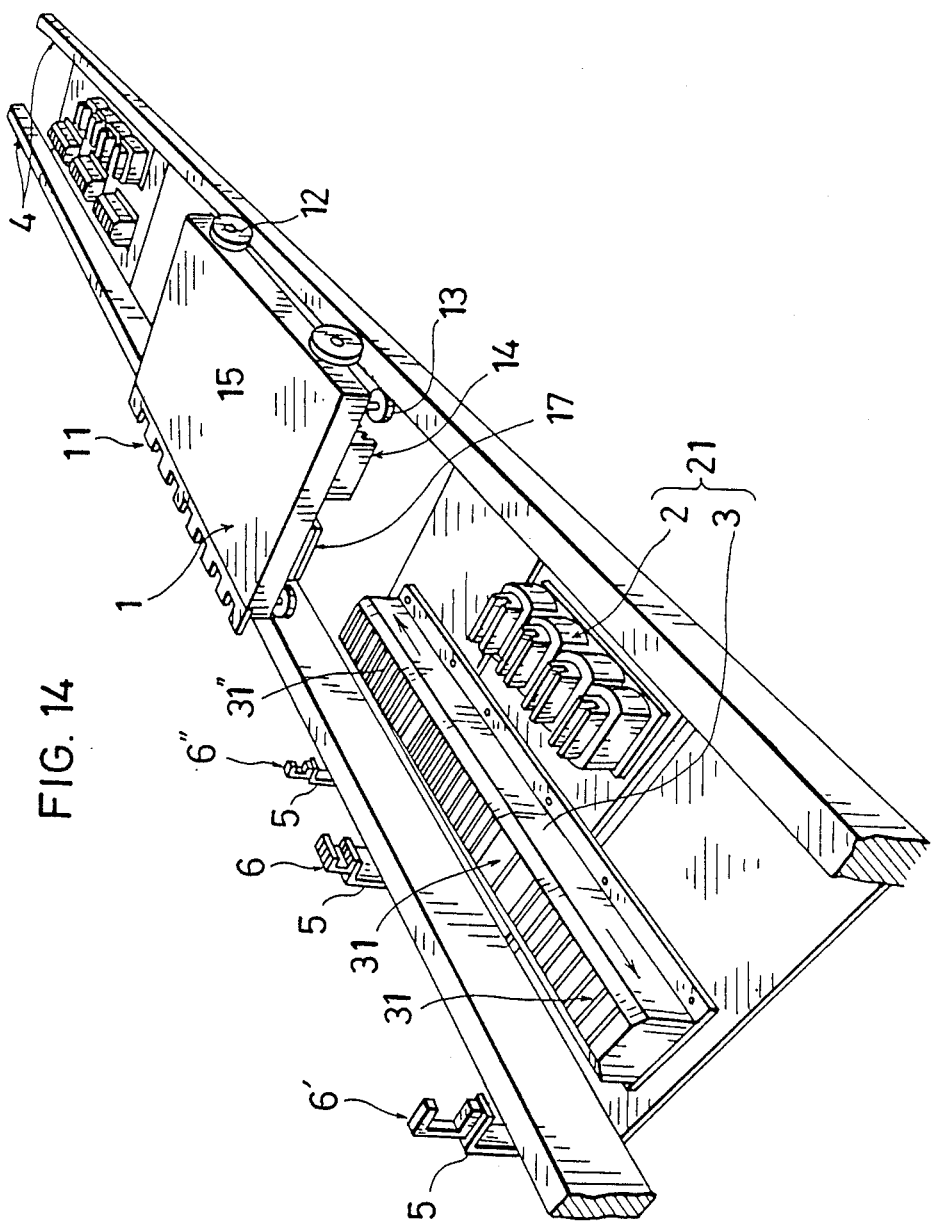
FIG. 14 is a perspective view of a fourth embodiment of the present invention.

FIG. 14 shows an arrangement which has the same action and effect as the embodiments of FIG. 12 and FIG. 13, namely, the linear induction motor primary side 3 is a set of iron cores larger than the length of the advancing direction of the linear step motor primary side 2, and three sets of dependent windings 31, 31', 31'' are disposed in respective iron cores so that each winding can achieve the same function as the linear induction motor primary sides 3, 3', 3'' of the preceding embodiment.

The construction of a controlling device of the third and fourth embodiments of the present invention is described below, with reference to FIG. 16.

Figure 16:
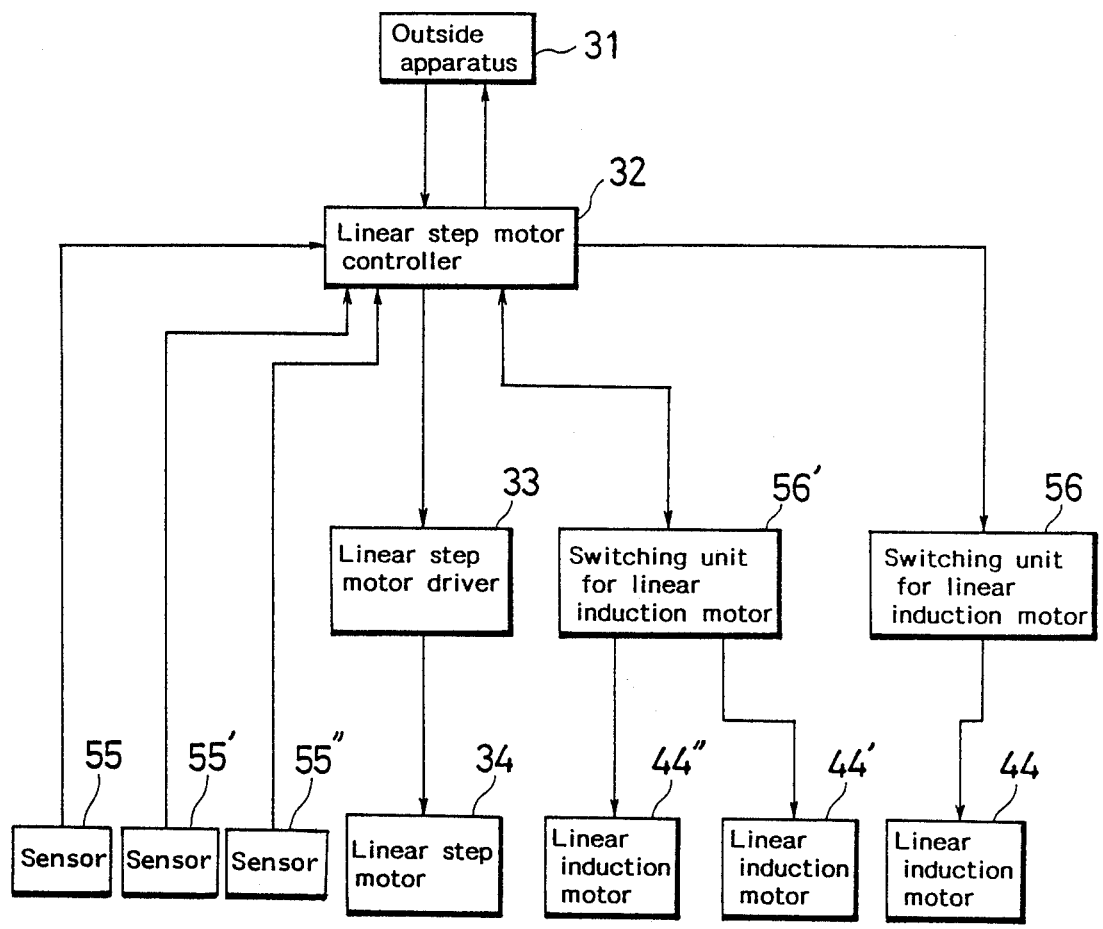
FIG. 16 is a block diagram showing the composition of a controlling device of the conveyor means as shown in FIG. 12, FIG. 13, FIG. 14 and FIG. 15.
Figure 17:
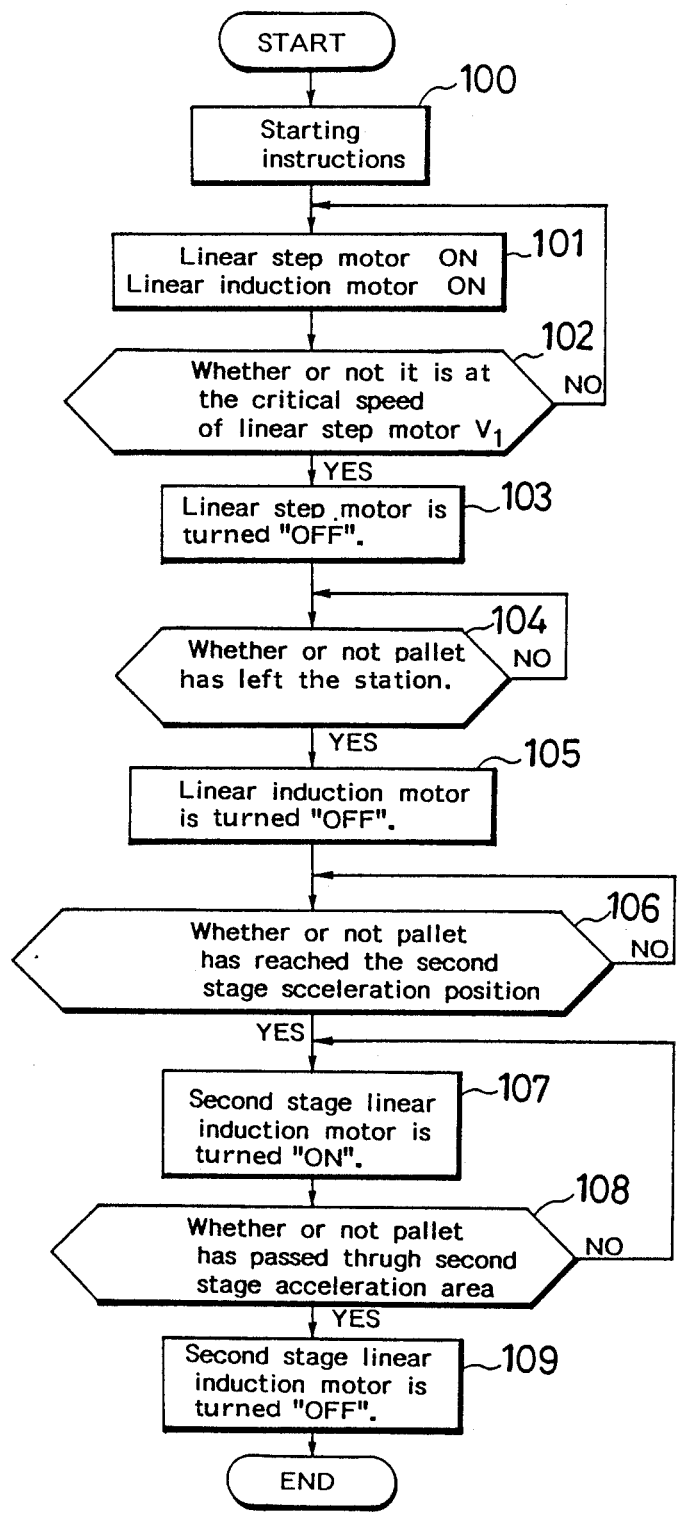
FIG. 17 is a flow chart at the time of speed acceleration of the transporting pallet of the third and fourth embodiments.

The controlling device in FIG. 16 involves an addition of two linear induction motors 44', 44'', two sets of photo-sensors 55', 55'' and a linear induction motor switching unit 56' to the construction shown in FIG. 9. It is possible to effect transportation at a high speed, without changing the control function of the linear step motor and without increasing the electric source capacity, by making such added parts achieve control at such high speed.

Description will be made below of the action of the third invention of the present invention, with reference to FIG. 18 which is a flow chart at the time of acceleration of the transporting pallet.

When starting instructions are input from the outside apparatus 31 (computer, outside controlling device, operational buttons or the like) to the linear step motor controller 32 (100), the linear step motor controller 32 judges an accelerating direction, and the linear step motor 34 and the linear induction motor 44 are started simultaneously so that the transporting pallet 1 is accelerated in the same direction (101).

The transporting pallet 1 is accelerated abruptly by thrust from both motors and when it reaches a specified set speed V1 (102), excitation of the linear step motor 34 is turned "OFF" and thereafter acceleration is effected by only the linear induction motor 44 (103). This is because, as is obvious from the speed characteristic of the liner step motor 34 shown in FIG. 2, there is a critical point for the maximum speed of the linear step motor 34 and when the speed exceeds the critical point, further accelerating thrust is not generated by the linear step motor 34 and excitation is meaningless.

When the sensor 55 or the like detects that the transporting pallet 1 has left (passed through) the station (104), the linear induction motor 44 is turned "OFF" (105).

Then, when the sensor 55' or the like detects that the transporting pallet 1 has reached a secondary accelerating area (106), the linear induction motor 44' is turned "ON" (107) and the transporting pallet 1 is accelerated further. When the sensor 55' or the like detects that the transporting pallet 1 has passed through the accelerating area (108), the linear induction motor 44' or the like is turned "OFF" and the acceleration control terminates (109).

Figure 18:
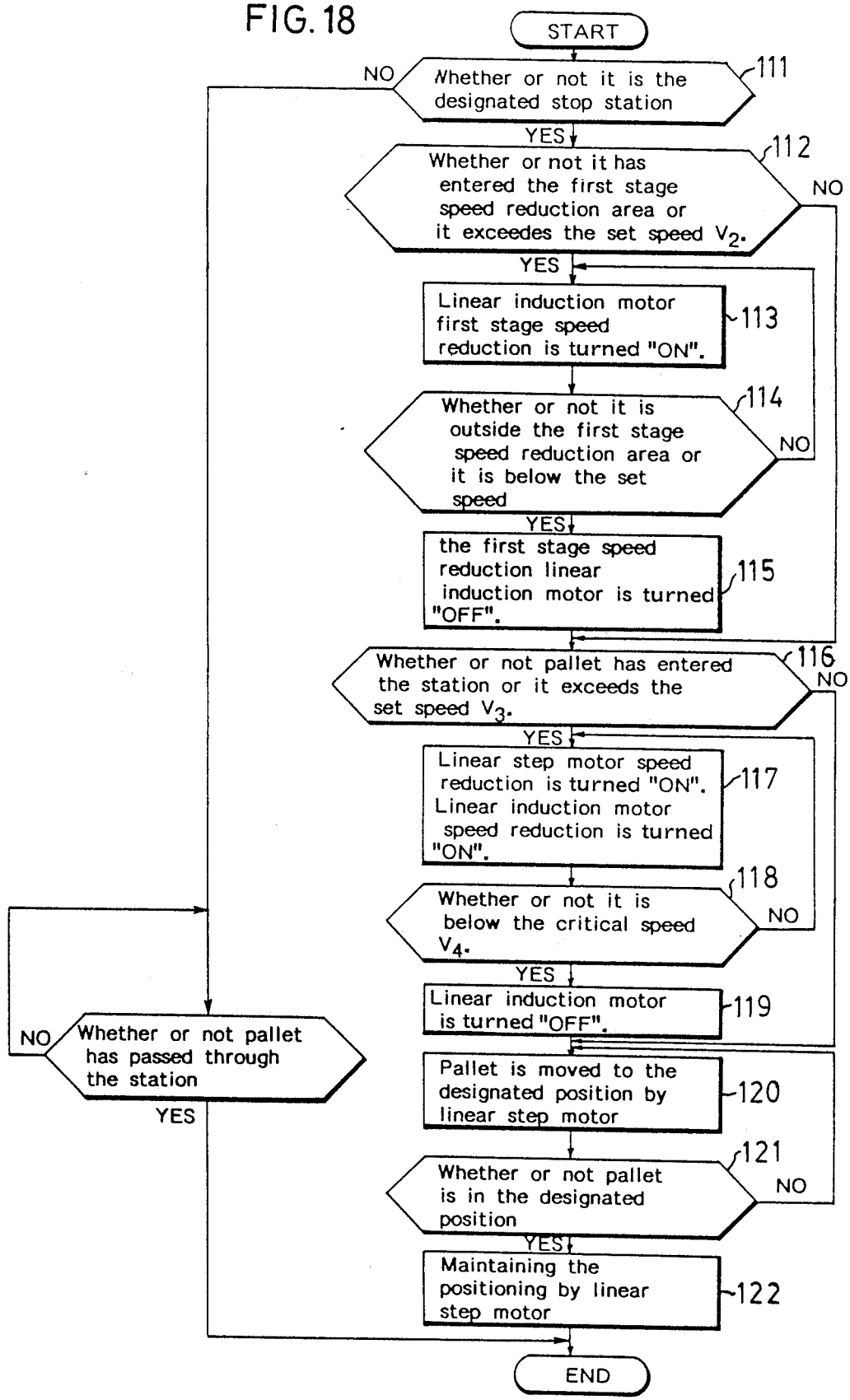
FIG. 18 is a flow chart at the time of speed deceleration and positioning of the transporting pallet of the third and fourth invention.

FIG. 18 shows a flow chart at the time of speed deceleration and positioning of the transporting pallet 1 of the present invention.

When the transporting pallet 1 is approaching a designated station from another station (111), the sensor 55'' detects entering of the transporting pallet 1 into a first stage of a set speed (V2) (112), the linear induction motor 44'' is turned "ON" (113), by which thrust in direction opposite to the advancing direction of the transporting pallet is generated and thus the control of speed deceleration is carried out. If the sensor 55' or the like detects that the speed of the transporting pallet 1 has reduced to a controllable speed (V2) (114), the control of speed deceleration by the linear induction motor is turned "OFF" (115).

In the case where the speed at the time of entering the first stage speed deceleration area is lower than the set value (V2), the first stage speed deceleration is not carried out and the transporting pallet 1 enters the station as it is.

Figure 15:
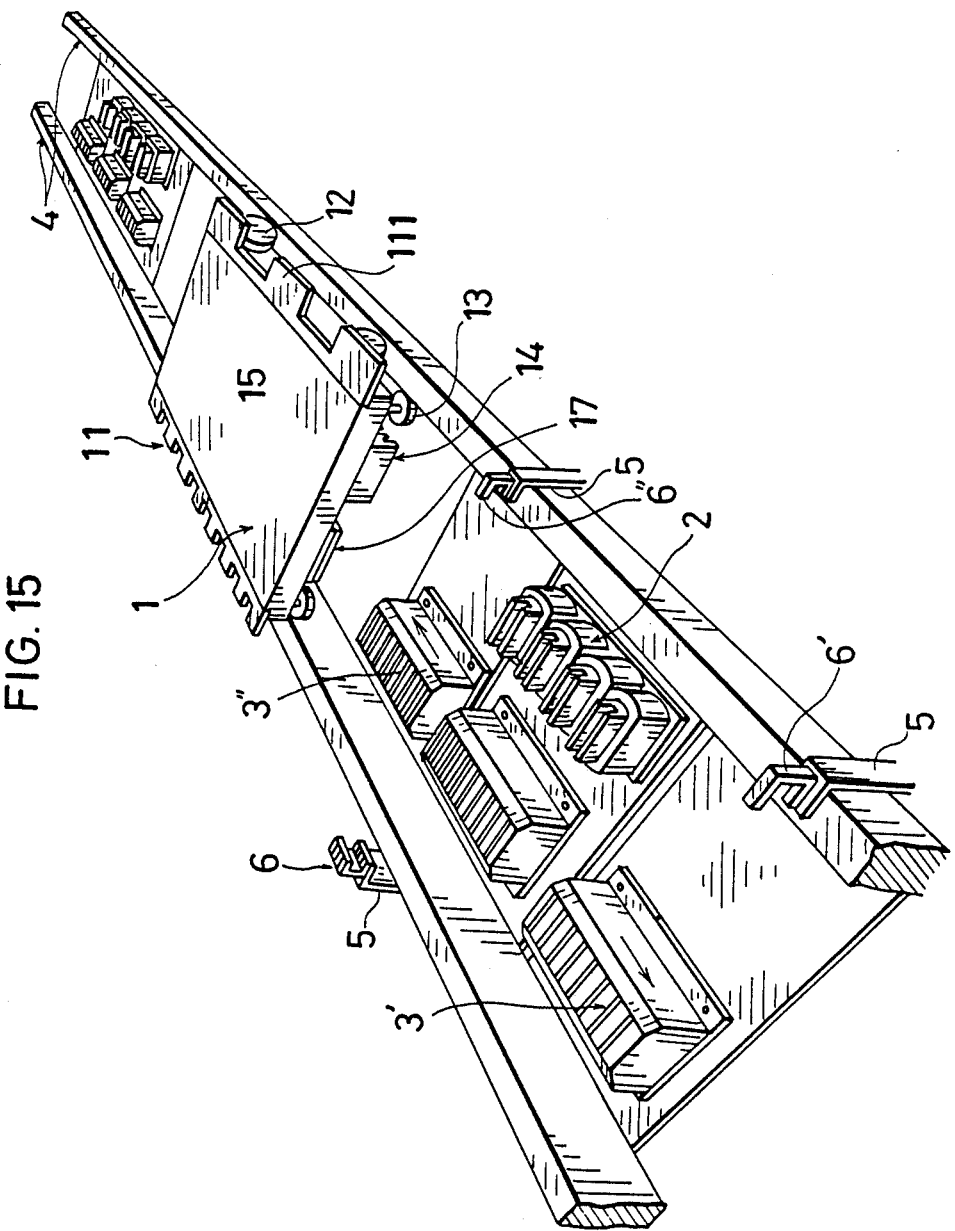
FIG. 15 is a perspective view of the conveyor means having a device to ensure a response by a photosensor as shown in FIG. 12.
Figure 20:
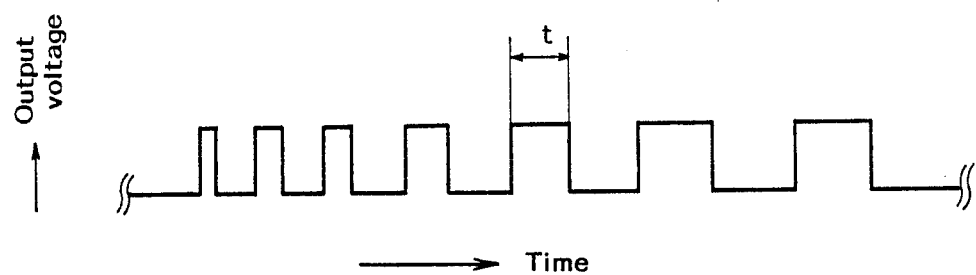
FIG. 20 is a wave diagram of output signals of the wave shaping circuit in FIGS. 19a and 19b.

Description will be made below of the judgment of whether or not the transporting pallet 1 in FIG. 15 has entered and has passed through the first stage deceleration area. FIGS. 19a and 19b are block diagrams showing an embodiment of a circuit construction whereby the linear induction motors 44' and 44'' are turned "ON" or "OFF" by the sensors 55', 55''. FIG. 20 is a wave diagram at an output signal part of a wave shaping circuit in FIGS. 19a, 19b 20 illustrates a case where the transporting pallet 1 has entered the first stage speed deceleration area.

In FIG. 19(a), the output of the sensor 55' is input to a wave shaping circuit 201 where it is wave shaped and is further input to a speed calculating circuit 202 and a transporting pallet entering and passing through judging circuit 203.

The speed of the transporting pallet 1 is calculated at speed calculating circuit 202 and is input to an "ON" and "OFF" signal output circuit 204 of the linear induction motor 44'. At the same time, judgment of whether or not the transporting pallet 1 has entered or passed through the first stage speed deceleration area is carried out at transporting pallet entering and passing through judging circuit 203. Signals of such judgment are input to "ON" and "OFF" signal output circuit 204 of the linear induction motor 44'.

Signals for "ON" or "OFF" of the linear induction motor 44' are output by the "ON" and "OFF" signal output circuit 204, whereby the linear induction motor 44' is turned "ON" or "OFF" through a switching circuit 205 of the linear induction motor 44'.

Similarly to the case of the sensor 55', the output of the sensor 55" causes the linear induction motor 44" to turn "ON" or "OFF" by a wave shaping circuit 301, a speed calculating circuit 302, a transporting pallet entering and passing through judging circuit 303, an "ON" and "OFF" signal output circuit 304 and a switching circuit 305 of the linear induction motor 44", as shown in FIG. 19(b).

If the transporting pallet 1 has entered the first stage speed deceleration area, such entering is detected by either the photo-sensor 55' of the photo-sensor 55" and its signal pulse is input to the wave shaping circuit 201 or 301. The wave of the output signal of the wave shaping circuit 201 or 301 is as shown in FIG. 20.

Where S is the length of a tooth of the slit plate 11 of the transporting pallet 1 and n is the number of teeth, the speed calculating circuit 202 or 302 calculates t which is the time of one pulse of the photo-sensor 55' or 55". On this basis, the speed of the transporting pallet 1, namely $V = S/t$, is calculated.

That the transporting pallet 1 has entered the first stage speed deceleration area is detected in the following way, namely, among waves of the output signals of the wave shaping circuits 201 or 301 in FIGS. 19a and 19b, a pulse signal part which is generated first is detected by the transporting pallet entering and passing through judging circuit 203 or 303, whereby it is judged that the transporting pallet 1 has entered the first stage speed deceleration area.

Judgment of whether or not the transporting pallet 1 has passed through the first stage speed deceleration area is done in the following way. The number of pulses K generated by the sensor 55' or 55" is detected by the transporting pallet entering and passing through judging circuit 202 or 302, (n−K) is calculated by the transporting pallet entering and passing through judging circuit 202 or 302, and at the time when n−K=0, it is judged that the transporting pallet 1 has passed through the first stage speed deceleration area.

When the transporting pallet 1 has entered the station, the entering direction and the entering speed are detected by the sensor 55 and if the entering speed is in excess of the specified set speed V3 (116), the speed is reduced by the linear induction motor 44 and the linear step motor 34 (117). As to the method of reducing the speed, in the case of the linear induction motor 44, negative phase control is carried out so that thrust is generated opposite to the entering direction of the transporting pallet 1. In the case of the linear step motor 34, a closed loop control is carried out by the sensor 55 and therefore it is possible to reduce the speed of the transporting pallet 1 by exciting the phase where the teeth of the primary side of the linear step motor 34 engage with the teeth of the secondary side plate.

If the speed of the transporting pallet is reduced down to the specified set speed V4 (118), speed reduction by the linear induction motor 44 has become unnecessary and the negative phase control is discontinued (119).

Thereafter, the transporting pallet 1 is moved toward the designated stop position by the linear step motor 34 (120). As soon as the transporting pallet 1 has reached the designated stop position (121), the transporting pallet 1 is held by the linear step motor 34 and positioning is carried out (122).

The values of set speeds V1, V2, V3 and V4 are variable. In this embodiment, V2>V3>V4.

Figure 21:
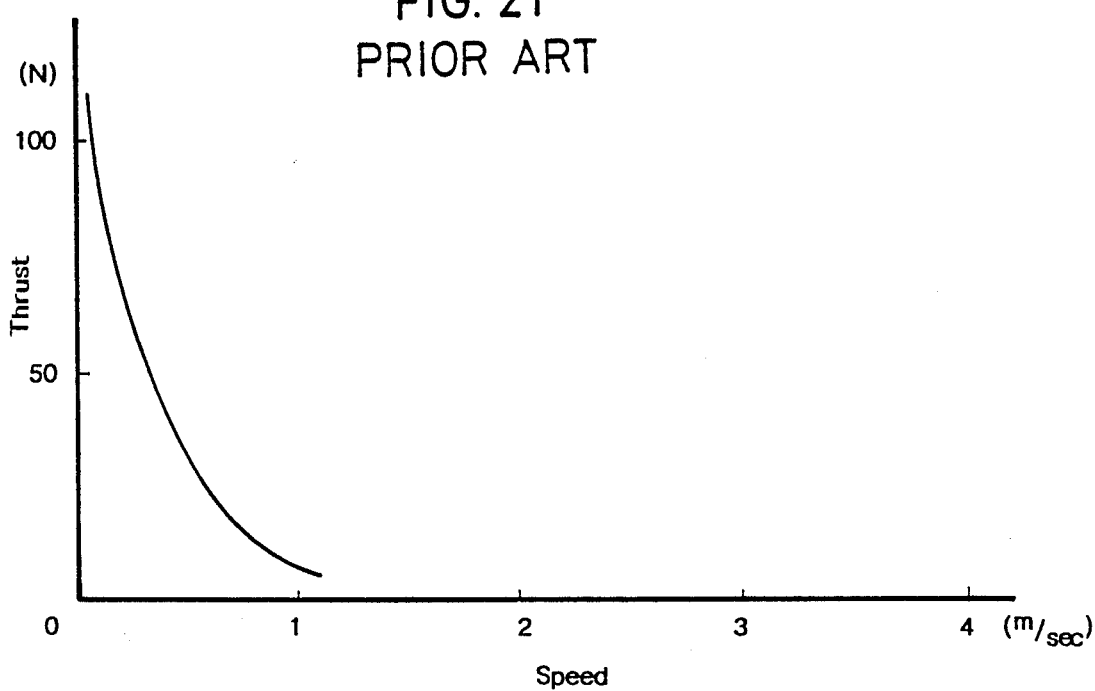
FIG. 21 is a graph showing thrust characteristics of the known device shown in FIG. 1.

FIG. 21 shows an example of the thrust characteristics of a conveyor means using the conventional linear step motor. As can be seen from this figure, large thrust can be obtained at the time of speed deceleration of the transporting pallet, but thrust is decreased abruptly with an increase of the speed.

Figure 22:
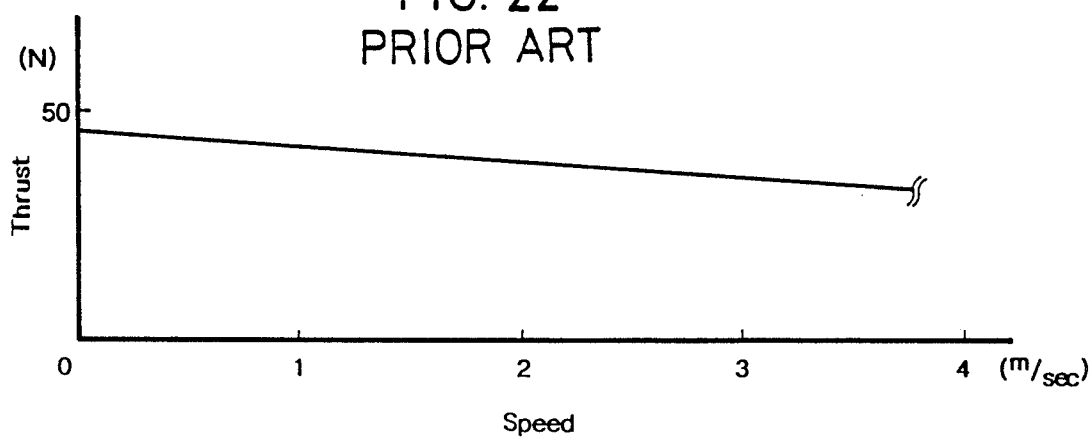
FIG. 22 is a graph showing thrust characteristics of the known device shown in FIG. 3.

FIG. 22 shows an example of the thrust characteristics of a conveyor means using a linear induction motor of a synchronous speed of 7 m/sec. It shows that almost the same thrust is obtained within a speed range less than 4 m/sec, regardless of changes of speed.

Figure 23:
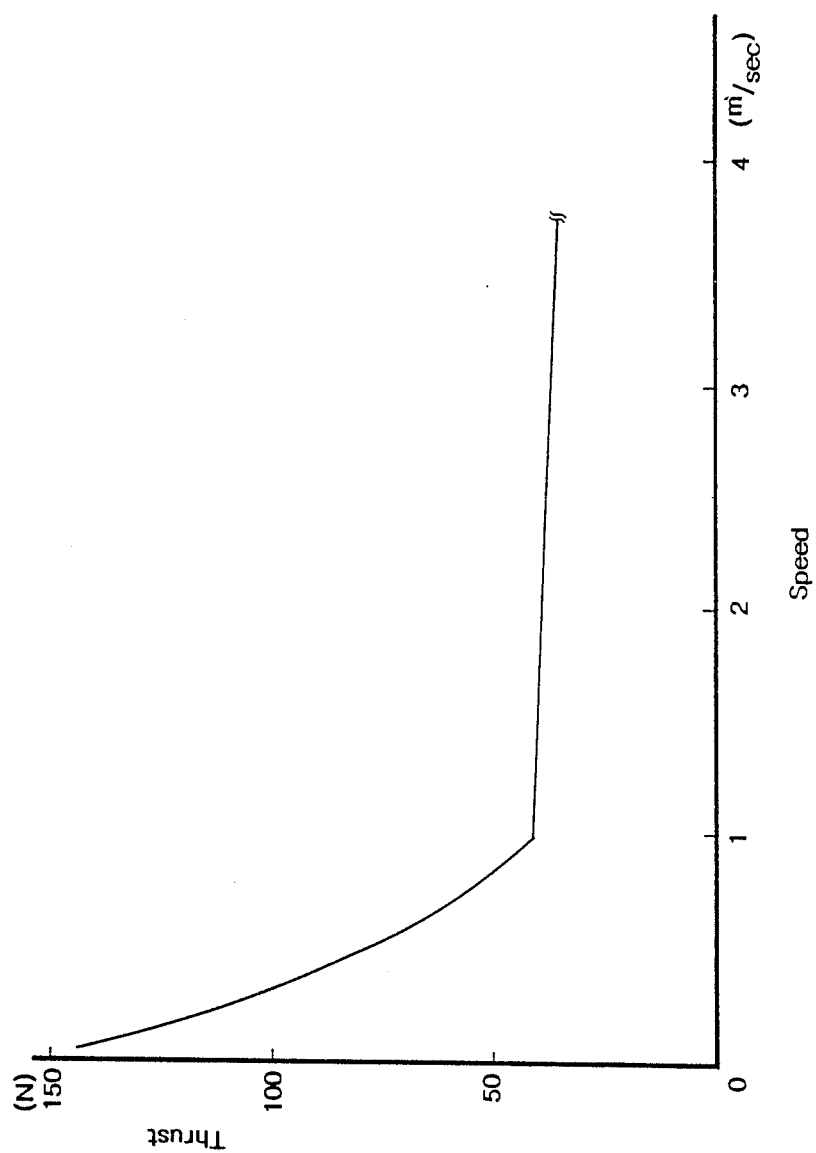
FIG. 23 is a graph showing thrust characteristics in the conveyor means of the first and second embodiments of the present.

FIG. 23 shows an example of the thrust characteristics of the conveyor means of the first and second embodiments of the present invention, using both a linear step motor and a linear induction motor and illustrates a combination of the thrust characteristics shown in FIG. 21 and in FIG. 22. As is obvious from this drawing, since the transporting pallet 1 has large thrust at the stage of low speed, it is possible to accelerate the transporting pallet 1 momentarily. Moreover, the large holding force of the linear step motor can be utilized at the time of positioning, and therefore positioning of high accuracy can be obtained.

Figure 24:
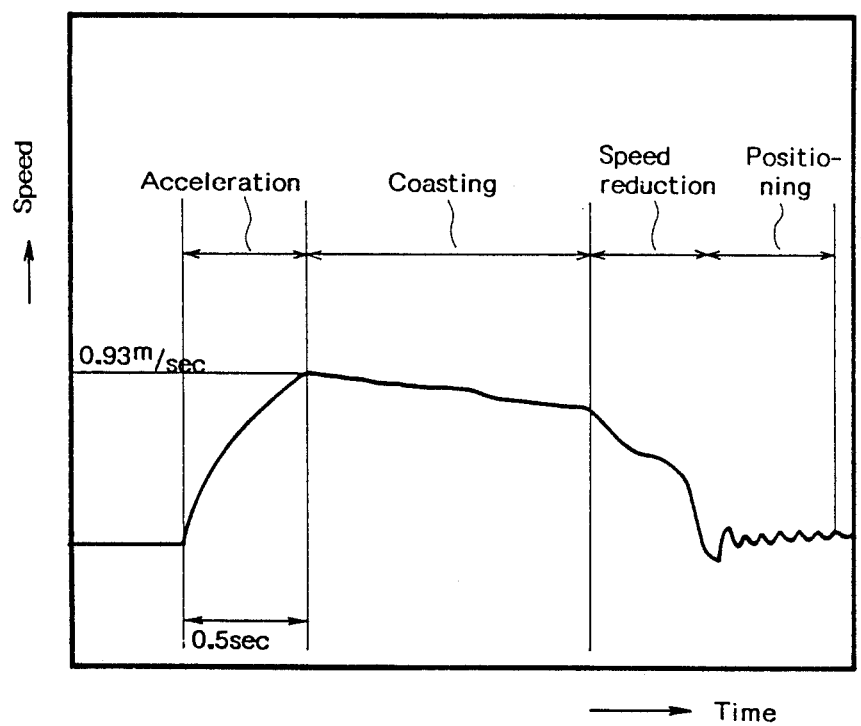
FIG. 24 is an explanatory graph of measured values of the time-speed characteristics of the known device shown in FIG. 1.

FIG. 24 shows an example of measured values of the time-speed characteristics in a conveyor means using the conventional linear step motor, in the case where a load on the transporting pallet 1 is 0 Kg and the exciting current of the linear step motor is 3A. As can be seen from this figure, the starting acceleration from the initial speed of 0 m/sec. is high, and with an increase of speed, acceleration becomes small. Speed deceleration and positioning are done accurately.

Figure 25:
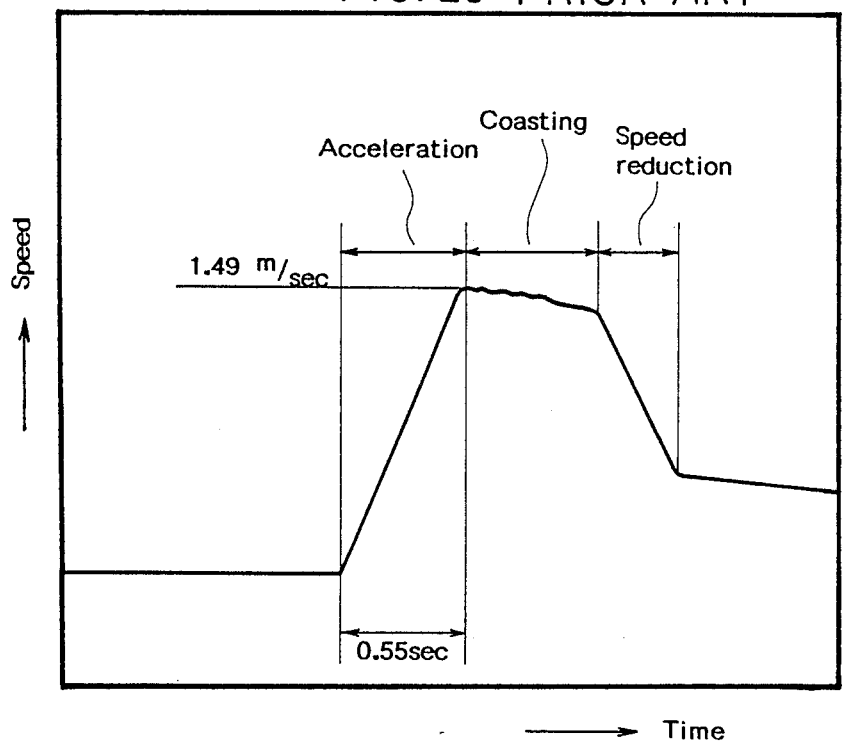
FIG. 25 is an explanatory graph of measured values of the time-speed characteristics of the known device shown in FIG. 3.

FIG. 25 shows an example of measured values of the time-speed characteristics in a conveyor means using the conventional linear induction motor, in the case where a load is 0 Kg, the linear induction motor is AC, 3φ 200 V and 2 KVA. As can be seen from this figure, acceleration and deceleration progress at almost the same rate.

Figure 26:
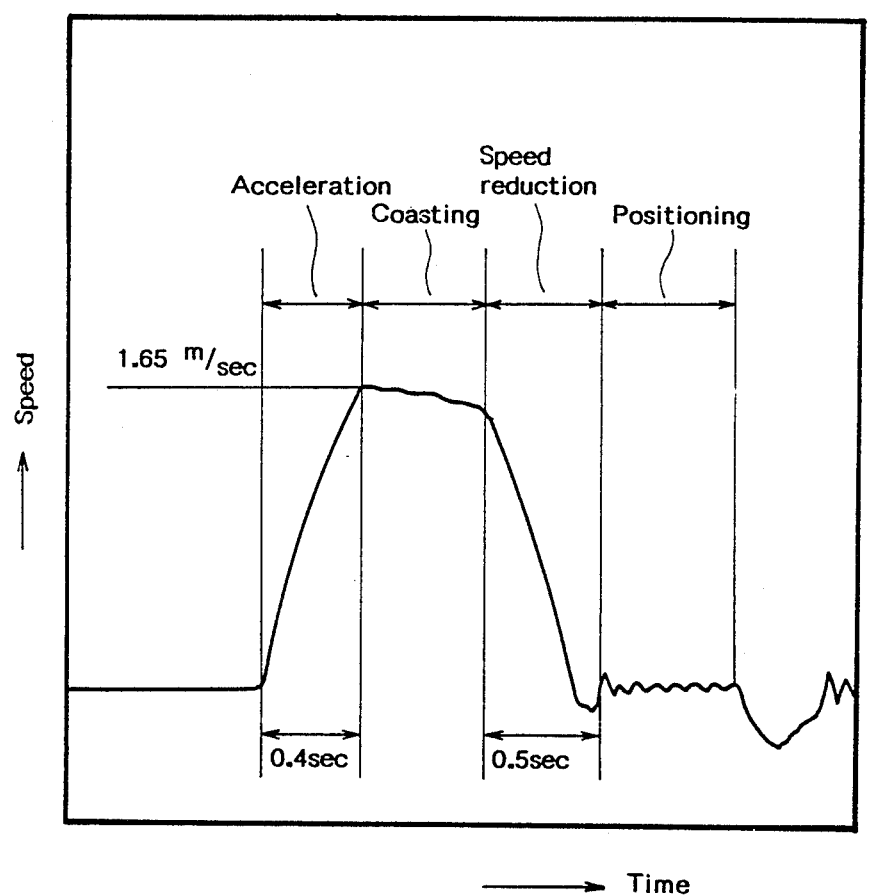
FIG. 26 is an explanatory graph showing the measured values of the time-speed characteristics of in the first and second embodiments of the present invention.

FIG. 26 shows an example of measured values of the time-speed characteristics in a conveyor means of the first and second embodiments of the present invention and the second invention of the present invention, using a linear step motor and a linear induction motor at the station, in the case where a load on the transporting pallet 1 is 0 Kg and each motor is the same as before.

Figure 27:
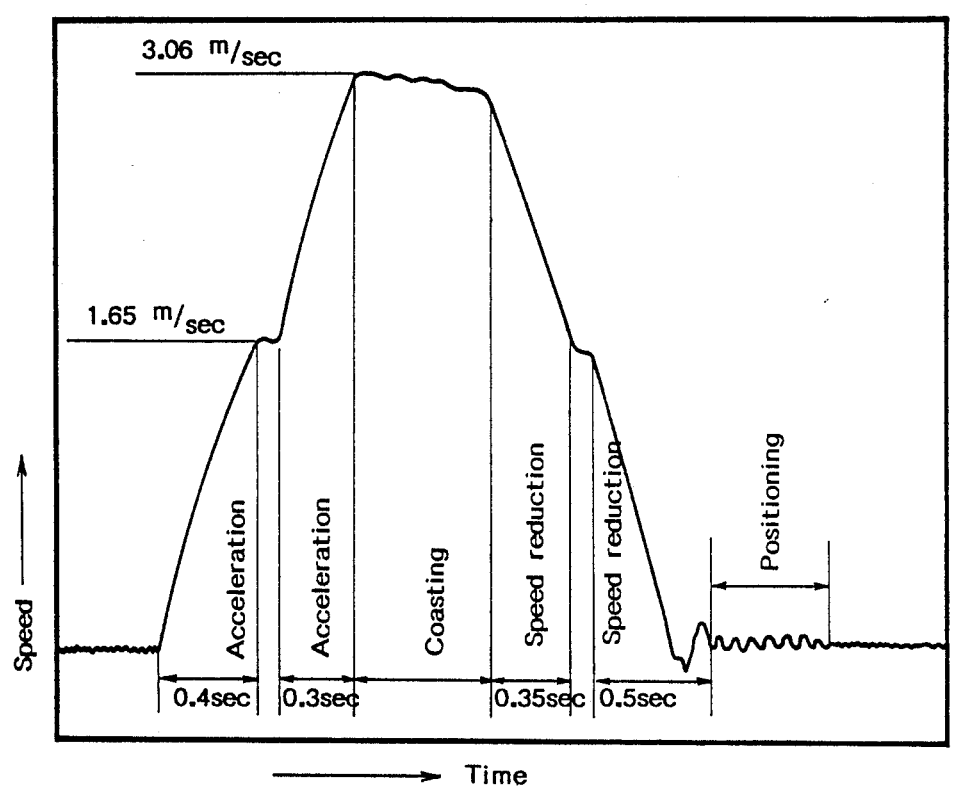
FIG. 27 is an explanatory graph showing measured values of the time-speed characteristics of the third and fourth embodiments of the present invention.

FIG. 27 shows an example of measured values of the time-speed characteristics in the case where a linear step motor and a linear induction motor of the third embodiment of the present invention are used, with an additional linear induction motor for acceleration and deceleration provided close to the foregoing two motors. As is obvious from this figure, a large acceleration can be obtained at the time of acceleration and high speed of the conveyor means can be realized. Also, speed deceleration can be effected in a short time at the time of deceleration and positioning can be carried out accurately. As the time required for acceleration and deceleration is very short, the linear induction motor can be of short time rating, and therefore more electric current can be employed by a linear induction motor of smaller capacity.

The first and second embodiments of the present invention provide high speed conveyance and stop positioning of high accuracy. Also, it is possible to use a linear induction motor of comparatively small capacity by making the linear induction motor of short time rating.

Also, while in the first embodiment the linear step motor primary side and the linear induction motor primary side are arranged at a right angle to the advancing direction of the transporting pallet, in the second embodiment the linear step motor secondary side and the linear induction motor secondary side are arranged at a right angle to the advancing direction of the trnsporting pallet. Therefore, both embodiments provide that the space between transporting track stations can be shortened.

The third embodiment of the present invention provides high speed conveyance and stop positioning of high accuracy, without increasing the electric power capacity, by using both the linear induction motor and the linear step motor by switching their in order.

The fourth embodiment of the present invention provides stop positioning of high accuracy by a simple controlling mechanism.

What is claimed is:

1. In a conveyor means including a transporting pallet which is moved along a transporting track by linear motors, the improvement wherein said linear motors comprise a linear step motor and a linear induction motor including:
    a linear step motor primary side and a linear induction motor primary side arranged side by side at a transporting track station at a right angle to the advancing direction of said transporting pallet; and
    a linear step motor secondary side and a linear induction motor secondary side arranged side by side on said transporting pallet at positions opposite to respective said primary sides.

2. In a conveyor means including a transporting pallet which is moved along a transporting track by linear motors, the improvement wherein said linear motors comprise a linear step motor and a linear induction motor including:
    a linear step motor secondary side plate and a linear induction motor secondary side plate arranged side by side at a transporting track station at a right angle to the advancing direction of said transporting pallet; and
    a linear step motor primary side and a linear induction motor primary side arranged side by side on said transporting pallet at positions opposite to respective said secondary side plates.

3. In a linear motor-driven conveyor means including a transporting pallet which runs along a transporting track and which is driven by linear motors, the improvement wherein said linear motors comprise:
    a linear step motor including a linear step motor primary side provided at a transporting track station or on said transporting pallet and a linear step motor secondary side provided at said transporting track station or on said transporting pallet at a position opposite to said primary side of said linear step motor;
    a first linear induction motor including a linear induction motor primary side provided at said transporting track station or on said transporting pallet and a linear induction motor secondary side provided at said transporting track station or on said transporting pallet at a position opposite to said primary side of said first linear induction motor; and
    a second linear induction motor for acceleration and deceleration and having a primary side or a secondary side plate at said transporting track station at a location adjacent the respective said side of said first linear induction motor in the advancing direction of said transporting pallet, said second linear induction motor for acceleration and deceleration being connected to said first linear induction motor upon advancement of said transporting pallet.

4. In a linear motor-driven conveyor means as claimed in claim 3, wherein said second linear induction motor for acceleration and deceleration is formed by a primary side thereof positioned at said transporting track station combined with said secondary side plate of said first linear induction motor.

5. In a linear motor-driven conveyor means as claimed in claim 3, wherein said second linear induction motor for acceleration and deceleration is formed by a secondary side plate thereof positioned at said transporting track station combined with said primary side of said first linear induction motor.

6. In a linear motor-driven conveyor means as claimed in claim 3, further comprising a plurality of sensors provided at positions corresponding to said second linear induction motor for detecting the speed and for determining the position of said transporting pallet.

* * * * *